United States Patent [19]

Skaletz et al.

[11] Patent Number: 5,700,556
[45] Date of Patent: Dec. 23, 1997

[54] GRANULES OF FIBER-REINFORCED THERMOPLASTIC

[75] Inventors: Detlef Skaletz, Darmstadt; Horst Heckel, Mainz; Bruno Wagner, Brechen; Joachim Heydweiller, Rüsselsheim, all of Germany

[73] Assignee: Hoechst Aktiengesellschaft, Frankfurt, Germany

[21] Appl. No.: 476,067

[22] Filed: Jun. 7, 1995

Related U.S. Application Data

[63] Continuation of Ser. No. 198,153, Feb. 17, 1994, abandoned.

[30] Foreign Application Priority Data

Feb. 19, 1993 [DE] Germany ............... 9302401 U

[51] Int. Cl.$^6$ ............................................. B32B 5/06
[52] U.S. Cl. ............... 428/297.4; 427/180; 427/206; 427/212; 428/298.1; 428/299.1; 428/299.4; 428/299.7; 428/300.4; 428/396; 428/402; 428/407
[58] Field of Search ................. 428/294, 303, 428/361, 375, 396, 402, 297.4, 298.1, 299.1, 299.4, 299.7, 300.4, 407; 427/180, 206, 212

[56] References Cited

U.S. PATENT DOCUMENTS

| | | | |
|---|---|---|---|
| 2,877,501 | 3/1959 | Bradt | 264/143 |
| 3,825,516 | 7/1974 | Schneider et al. | 523/323 |
| 3,920,879 | 11/1975 | Segal et al. | 161/197 |
| 4,003,874 | 1/1977 | Ide et al. | 523/219 |
| 4,037,011 | 7/1977 | Hattori et al. | 428/294 |
| 4,169,186 | 9/1979 | Tazaki et al. | 428/406 |
| 4,404,312 | 9/1983 | Kokubu et al. | 524/504 |
| 5,002,712 | 3/1991 | Goldmann et al. | 264/174 |
| 5,019,450 | 5/1991 | Cogswell et al. | 428/402 |
| 5,130,197 | 7/1992 | Temple | 428/378 |
| 5,236,781 | 8/1993 | Krijger et al. | 428/402 |
| 5,264,174 | 11/1993 | Takei et al. | 264/211.23 |
| 5,270,106 | 12/1993 | Orlowski et al. | 428/295 |

FOREIGN PATENT DOCUMENTS

| | | |
|---|---|---|
| 0056703 | 7/1982 | European Pat. Off. . |
| 0117098 | 8/1984 | European Pat. Off. . |
| 0364829 | 4/1990 | European Pat. Off. . |
| 66632 | 2/1973 | Luxembourg . |

OTHER PUBLICATIONS

Japanese Abstract No. 2215506 published Aug. 28, 1990.
Derwent Abstract No. 2049062 published Feb. 19, 1990.
Japanese Abstract No. 62268612 published Nov. 21, 1987.
Webster's Ninth New Collegiate Dictionary, 1990, pp. 532 & 868.

*Primary Examiner*—H. Thi Le
*Attorney, Agent, or Firm*—Curtis, Morris & Safford, P.C.

[57] ABSTRACT

In granules of fiber-reinforced thermoplastic material, a multiplicity of individual filaments of the reinforcing fiber (e.g. glass) are arranged in parallel in a matrix of the thermoplastic material (e.g. polypropylene). The fiber length corresponds to the granule length and is in the range from 3 mm to 8 mm. The melt viscosity of the thermoplastic material is above 100 Pa.s, the diameter of the granules (measured perpendicular to the fiber direction) is 1.7 to 5 mm and the ratio diameter:length of the granules is 0.4 to 1.66.

19 Claims, No Drawings

GRANULES OF FIBER-REINFORCED THERMOPLASTIC

This application is a continuation of application Ser. No. 08/198,153, filed Feb. 17, 1994, now abandoned.

BACKGROUND OF THE INVENTION

1. Field of the Invention

The invention relates to granules of fiber-reinforced thermoplastic material, in which a multiplicity of individual filaments of the reinforcing fiber is arranged in parallel in a matrix of a thermoplastic material and in which the fiber length corresponds to the granule length and is in the range from 3 mm to 8 mm.

2. Description of the Related Art

According to the process of EP-A1-56,703, a fiber-reinforced, heat-deformable composite material which contains thermoplastic polymer and at least 30% by volume of reinforcing filaments aligned in parallel is obtained by a pultrusion process. Pultruded strands of glass fiber-reinforced thermoplastics can be cut up to give granules of a length of 3 to 100 mm.

The process should make it possible to employ conventional thermoplastic materials of high molecular weight for the impregnation of filament strands. However, the process is no longer suitable for polymers which, at the processing temperature, have a high viscosity (above 100 Ns/m$^2$), because wetting of filament strands with such melts is no longer possible in the pultrusion process (EP-A1-56,703 B2 at page 3, line 10.

Fiber-reinforced granules of thermoplastic material available on the market until now, which were employed for injection molding or extrusion, are derived from polymers of low melt viscosity. The granule diameter is customarily 1.7 to 4 mm, the length at least 10 mm and the ratio length:diameter about 0.03 to 0.4. During processing using small plasticizing units, i.e. small funnel diameter, the flowability is frequently inadequate. The object was therefore to indicate novel granules having improved flowability.

SUMMARY OF THE INVENTION

The invention relates to granules of the type mentioned at the outset, in which the melt viscosity of the thermoplastic material is above 100 Pa.s, the diameter of the granules (measured perpendicular to the fiber direction) is 1.7 to 5 mm and the ratio diameter:length of the granules is 0.4 to 1.66. The melt viscosity in this case is measured at low shear rates.

DESCRIPTION OF THE PREFERRED EMBODIMENTS

To produce a fiber-reinforced composite material, a multiplicity of endless filaments, in particular having individual filament diameters of 7 to 30 micrometers, is preferably arranged in parallel and tensioned to form a ribbon, the filament ribbon is wetted with molten, thermoplastic polymer in a melt pultrusion process, the filament ribbon being drawn over at least two heated spreader surfaces and a proportion by volume of 5 to 70% by volume of continuous filaments being set in the solidifying filament ribbon. Alternatively, the proportion by volume of continuous filaments can be from 3 to 67 volume %. Measured at low shear rates, the melt has a viscosity of 105 to 2,500 Ns/m$^2$ (=Pa.s); the drawing tension on entry into the first spreader surface is preferably 5N to 50N per 4,000 individual filaments. The speed of the filament ribbon can be 3 m/min. The viscosity of the melt is preferably in the range 130–2,000 Pa.s, in particular 130–500 Pa.s. The individual filament diameters of the continuous filaments are preferably in the range from 7 to 24 μm. The proportion by volume of continuous filaments is preferably 15 to 70% by volume. The comminution of the pultruded strands is known to the person skilled in the art.

It has been shown that, with increasing viscosity of the melt, the necessary take-off tension also increases. At a viscosity of 105 Pa.s, this is at least 5N. It increases further with the filament surface area of the filament strand. The drawing tension during drawing off of the impregnated filament ribbon from the last spreader surface is higher than the drawing tension during entry into the first spreader surface and is preferably at least 50N per 4,000 individual filaments.

From example 49 of EP patent 56,703, it is already known that the tension with which the impregnated filament ribbon is drawn from a melt of 20 Ns/m$^2$ (and thus from the spreader surface) should be about 3.8 kg (for a strand of 6,000 filaments). For highly viscous melts this take-off tension, i.e. the drawing tension on entry into the first spreader surface, is substantially higher. Take-off tensions in the range from 20 to 80% of the tensile strength of the unwetted filament ribbon are preferred.

The thermoplastic material which can be employed for the granules is in particular polypropylene, polyamides, polyoxymethylene, polyethylene, polyurethane, polyphenylene sulfide, polycarbonate, polyethylene terephthalate and polybutylene terephthalate, or polyaryl ether ketones of appropriate molecular weight and their mixtures. The melting points of these polymers are in the range 135–265° C. A wetting of the reinforcing fibers which is as complete as possible should be ensured. The high viscosity of the melt is a feature of products having high molecular weight. The high molecular weight improves the recycling behavior, because on renewed (repeated) melting, despite oxidative thermal degradation of the melt (and falling of the melt viscosity) it remains in the high molecular weight range.

The cross section of the pultruded fiber strands and thus the granules produced is preferably approximately circular.

The fiber material consists of glass, carbon, aramid, steel or synthetic fibers.

The proportion by volume of fibers in the semi-finished product can be affected by adjusting the delivery rate of the polymer melt in relation to the filament speed. In addition, superfluous amounts of polymer melt can be stripped off through perforated plates.

The parallel, unidirectionally orientated reinforcing filaments needed in the process indicated, which consist of many filaments, are unwound from fiber bobbins (rovings) with control of the take-off force. This control can be effected mechanically, mechano-physically, electrically or electronically. Customarily, this directly applied take-off pre-tension is in the range from 10N to about 25N, depending on the type of rovings used and the strength of the fibers.

It has emerged that the take-off tension, once set, should advantageously be kept as constant as possible.

An apparatus which is particularly highly suitable to keep the take-off tension constant mechanically is the subject of German Utility Model 9 107 510.6 (Bolenz & Schäfer Maschinenfabrik GmbH).

The pretension can be further increased, if necessary, by inserting one or more further pairs of tensioning bars between the bobbin and impregnation device. The time- and also the roving-dependent constancy of the pretension remains guaranteed here.

As a result of the number, the diameter and the position of the tensioning bars determining the angle of wrap, the take-off tension needed for the transport of the filaments can be varied within wide limits. The tension progressively increases here, starting from the bobbin in the direction of the braking system, guide element/combs, up to the guide bars before the 1st spreader surface. After wetting of the filament, the tension increases further (in the direction of the winding bobbin for composite material).

The fibers, which are thus aligned in parallel and pretensioned, now enter the impregnation device, in particular an impregnation die. To accelerate the throughput, the fibers can be preheated. Temperatures of up to 100K above the processing temperature of the melt have proven suitable here. The heating of the filaments can be effected by infrared, contact, radiation or hot gas preheating.

Devices having spreader surfaces for the impregnation of fiber material are known. U.S. Pat. No. 4,439,387 discloses an extruder apparatus in which several fiber strands are drawn at different positions, which are arranged in succession in the transport direction of the material, into the interior of the apparatus filled with polymer melt and impregnated there with melt. The spreader surfaces 212, 214 and 216 should in this case improve the wetting of the fiber strands with melt.

An apparatus which is highly suitable for carrying out the process according to the invention is described in U.S. Pat. No. 4,957,422. The chicane (b) in the entry part (1) of the apparatus (before wetting with melt) represented in FIG. 1, however, can be dispensed with here.

The impregnation device used is preferably essentially closed, such that the ingress of atmospheric oxygen and the thermooxidative polymer damage associated therewith can be kept small. Inside the impregnation device, the fibers are preferably drawn over at least three spreader surfaces. These are of undulatory shape.

Using a broad impregnation die, a multiplicity of individual filament ribbons can be obtained. When using a slit die, the whole of the wetted filament ribbons can be combined to give a single ribbon and this can then be fed to a polishing roll mill. The slit die can have e.g. slit heights between 0.15–5 mm, in particular 0.7–2 mm. The component strands can be shaped by controlled roll systems and be given e.g. a rectangular, elliptical or circular cross section.

Semi-finished products can be produced in the form of continuous, broad ribbons (tapes) of up to 500 mm, preferably 100 to 320 mm, and thicknesses between 0.2 and 0.7 mm, and also profiles in a wide range of dimensions (flat 25×0.25 mm, 5×0.4 mm, 3.5×0.8 mm etc., round profiles up to diameters of about 5 mm) as single or multiple strands, or strands having diameters of up to 5 mm, which can then be cut to give longitudinal sections (pellets) of 3 to 100 mm, preferably 10 to 50 mm. These strands can also be prepared in parallel and simultaneously as a single semi-finished product or in a number of up to 150 strands.

The invention is illustrated in greater detail by the examples.

EXAMPLE

A glass fiber filament ribbon (E-glass OCF 1570) was pultruded (speed of the filament ribbon 3.3 m/min) with molten polypropylene (=PP) using a high drawing tension (15N/4000 individual filaments, measured on entry into the first spreader surface). The composite material obtained had a weight of 4.420 g/m. A glass content of 47.3% weight was shown by ashing. A content of 2.330 g/m of PP and 2.090 g/m of glass is calculated from this. The hydrostatically determined volume of the composite material was 3.451 cm$^3$/m. A density of the composite material of 1.281 g/cm$^3$ is calculated from this and from the weight per m. The density of the PP is 0.907 g/cm$^3$, and that of the glass 2.588 g/cm$^3$.

The porosity is calculated according to the formula

% by volume pores=100×(1-Gg/dg+Gp/dp): V.

In this formula,

Gg is the weight of glass component/m dg is the glass density

Gp is the weight of polymer component/m dp is the polymer density

V is the volume/m

The porosity in the example is calculated to be 2.15% by volume.

In a comparison experiment with unaltered supply of PP melt and filament material, only the drawing tension was decreased. The composite material obtained had a weight of 4.214 g/m. A content of 49.2% by weight of glass was shown by ashing. The hydrostatically determined volume of the composite material was 3.379 cm$^3$/m. A porosity of 6.45% by volume is calculated from this.

As the comparison shows, the determination of the strand weight (longitudinally-related mass) on its own does not permit a reliable determination of the pore volume. As a result of the decrease in the originally high take-off tension, the undesired porosity increases by about a factor of 3.

We claim:

1. A granule composed of fiber-reinforced thermoplastic material, in which a multiplicity of individual reinforcing material, are arranged in parallel in a matrix of the thermoplastic material, and the fiber length corresponds to the granule length and is in the range from 3 mm to 8 mm, the reinforcing fibers having been wetted in a pultrusion process with a thermoplastic melt wherein the melt viscosity of the thermoplastic material is above 100 Pa.s at processing temperature, the diameter of the granule (measured perpendicular to the fiber direction) is 1.7 to 5 mm and the ratio diameter:length of the granule is 0.4 to 1.66.

2. The granule as claimed in claim 1, wherein the reinforcing fibers are comprised of glass.

3. The granule as claimed in claim 1, wherein the thermoplastic material is comprised of polypropylene.

4. The granule as claimed in claim 1, wherein the proportion of reinforcing fibers in the granule is 3 to 67% by volume.

5. The granule as claimed in claim 1, wherein the reinforcing fibers have diameters of 7 to 30 micrometers.

6. The granule as claimed in claim 1, wherein the reinforcing fibers are comprised of glass, carbon, aramid, steel or synthetic fibers.

7. The granule of claim 1, wherein said thermoplastic material contains at least one polymer selected from the group consisting of polypropylene, polyamides, polyoxymethylene, polyethylene, polyurethane, polyphenylene sulfide, polycarbonate, polyethylene terephthalate, polybutylene terephthalate, polyaryl ether ketones and mixtures thereof.

8. A method of making granules of fiber-reinforced thermoplastic material, in which a multiplicity of individual reinforcing fibers are arranged in parallel in a matrix of thermoplastic material as claimed in claim 1, comprising the steps of:

(a) arranging a plurality of individual filaments in parallel and under tension to form a filament ribbon;

(b) wetting the filament ribbon with molten thermoplastic polymer to form impregnated pultruded strands;

(c) comminuting the impregnated pultruded strands to produce composite granules wherein the tension is in the range from 20 to 80% of the tensile strength of the filament ribbon.

9. The method as claimed in claim 8, wherein the filament ribbon has a drawing tension of 5N to 50N per 4,000 individual filaments.

10. The method as claimed in claim 8, wherein the reinforcing fibers are comprised of glass, carbon, aramid, steel or synthetic fibers.

11. The method as claimed in claim 10, wherein the reinforcing fibers are comprised of glass.

12. The method as claimed in claim 8, wherein the thermoplastic material is comprised of polypropylene.

13. The method as claimed in claim 8, wherein the proportion of reinforcing fibers in the granule is 3 to 67% by volume.

14. The method as claimed in claim 8, wherein the individual filaments have diameters of 7 to 30 micrometers.

15. The method as claimed in claim 8, wherein during step (b), the filament ribbon is drawn over at least two heated spreader surfaces.

16. The method as claimed in claim 15, wherein the filament ribbon has a drawing tension during drawing off of the impregnated pultruded strand from the melt higher than the drawing tension during entry into the first spreader surface.

17. The method as claimed in claim 16, wherein the drawing tension during drawing off is at least 50N per 4,000 filaments.

18. The method of claim 8, wherein during step (b) the filament ribbon is drawn through the molten thermoplastic at a speed greater than about 3 m/min.

19. A fiber-reinforced granule made by the method according to claim 8.

* * * * *